No. 663,007. Patented Dec. 4, 1900.
C. M. BRIDGES.
ACETYLENE GAS GENERATOR.
(Application filed June 25, 1900.)
(No Model.) 2 Sheets—Sheet 1.
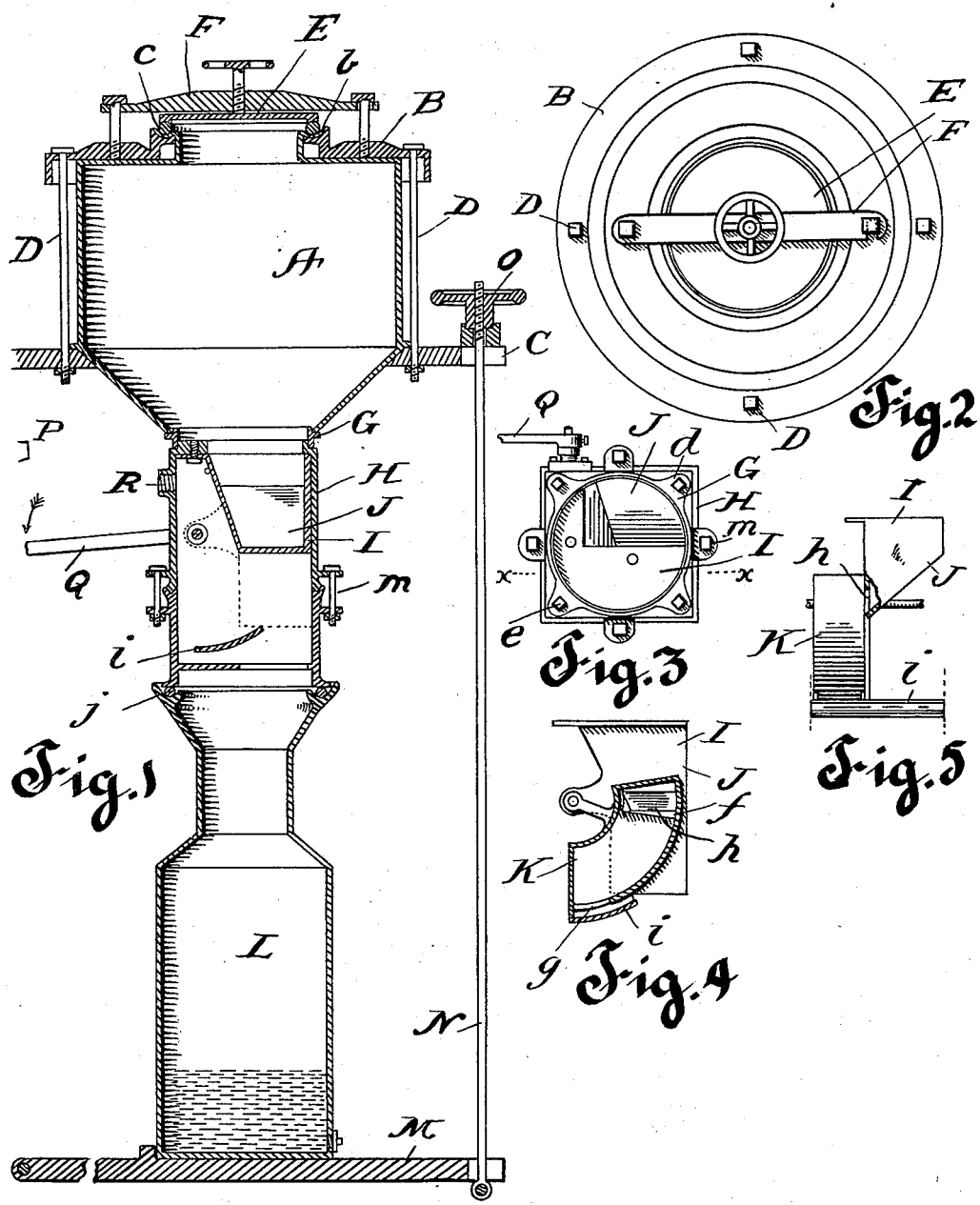
WITNESSES:
Eliz. Kincaid.
S. Leavel
INVENTOR
Christopher M. Bridges.
BY
Kincaid & Co.
his ATTORNEYS
THE NORRIS PETERS CO., PHOTO-LITHO., WASHINGTON, D. C.

No. 663,007. Patented Dec. 4, 1900.
C. M. BRIDGES.
ACETYLENE GAS GENERATOR.
(Application filed June 25, 1900.)
(No Model.) 2 Sheets—Sheet 2.
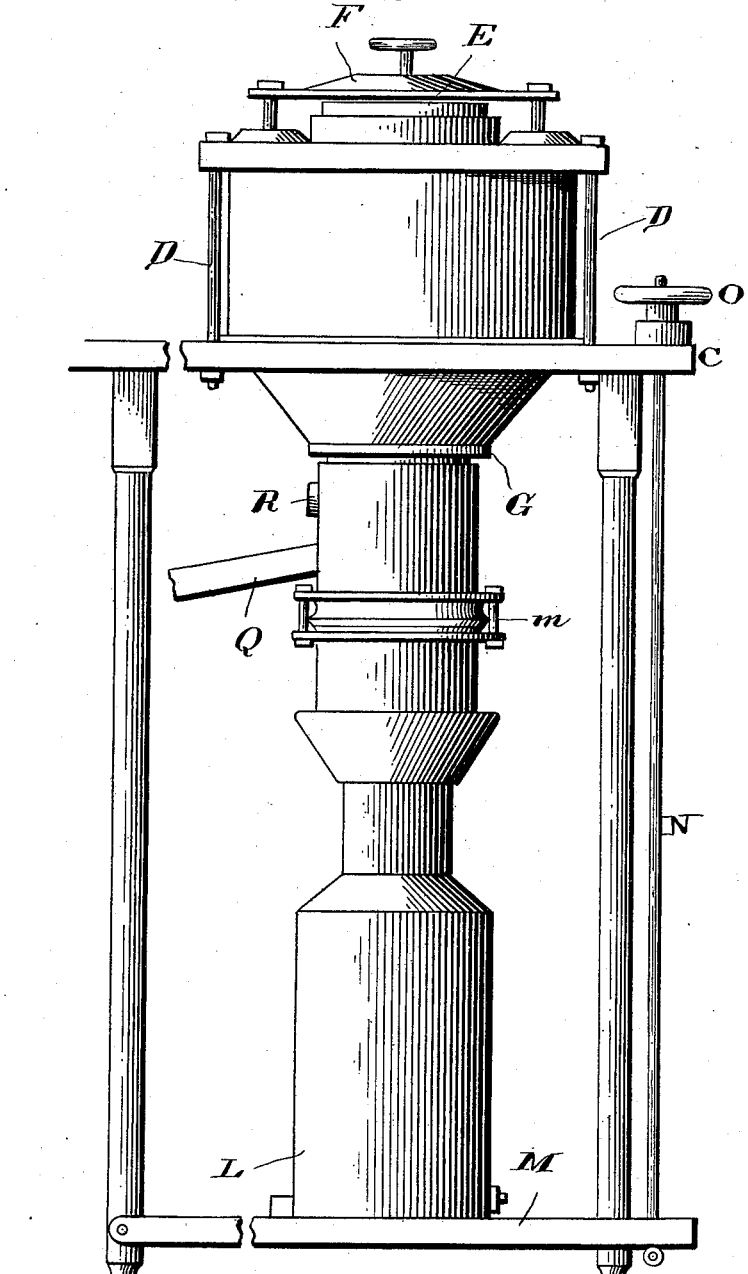

UNITED STATES PATENT OFFICE.

CHRISTOPHER M. BRIDGES, OF SAN FRANCISCO, CALIFORNIA.

ACETYLENE-GAS GENERATOR.

SPECIFICATION forming part of Letters Patent No. 663,007, dated December 4, 1900.

Application filed June 25, 1900. Serial No. 21,564. (No model.)

*To all whom it may concern:*

Be it known that I, CHRISTOPHER M. BRIDGES, a citizen of the United States, residing at San Francisco, in the county of San Francisco and State of California, have invented certain new and useful Improvements in Feeders for Acetylene-Gas Machines; and I do hereby declare the following to be a full, clear, and exact description of the invention, such as will enable others skilled in the art to which it appertains to make and use the same.

My present invention is an improvement in devices for the generation of the gas known as "acetylene" or "ethine" ($C_2H_2$) and is designed for its simplicity of construction and safety and certainty of operation.

The action of the generator is so arranged as to be absolutely automatic with the consumption of the gas.

One of the methods of regulating the generation of gas is by controlling a flow of water to a bulk of calcium carbid. As soon as this carbid is reached by the water the oxygen of the water combines with the calcium to form lime, while the hydrogen unites with the carbon to form acetylene. Now this admission of a small quantity of water to a bulk of carbid necessarily causes the latter to immediately heat and generate an extremely-hot gas, which must be cooled and purified previous to consumption, while the carbid not immediately consumed is caused to rapidly deteriorate. I have completely reversed the above operation, causing the carbid to be fed to a cool body of water, and thereby overcome the above objections. This latter method I have employed in the devices shown in my former applications for patents; but in these I have relied on the action of the gas-receiver to regulate the amount of carbid fed. Now should by any cause the receiver fail to respond to the influence of the gas or should the gate regulating the flow of carbid become inoperative the excessive flow of carbid to the water would cause more gas to be generated than could be controlled, and consequently considerable danger would result. Now to overcome this objection I have contrived a generator in which a certain predetermined amount only of carbid can be fed at each action of the gas-holder, and consequently should the parts become deranged the generation of the gas would cease without serious consequences.

In the accompanying drawings, in which similar letters of reference designate corresponding parts, Figure 1 is a central vertical section of the complete generator. Fig. 2 is a top view of the carbid-reservoir. Fig. 3 is a top view of the feeder. Fig. 4 is a section of the feeder, taken on the line X X, Fig. 3. Fig. 5 is a view of the feeder, taken at right angles to Fig. 4. Fig. 6 is a side elevation of a machine embodying my invention complete.

Referring now to the several views by letter, A represents the carbid-reservoir, which is a cylindrical metal vessel formed with a conical bottom. Forming the top of this vessel A is the metal casting B, the periphery of which projects beyond the vessel A and is securely held down to the stationary framework C by means of the bolts D. This framework C is supported upon suitable pillars or other similar supports provided therefor. The small flange of the vessel A rests on the framework C, while the conical extremity protrudes through an opening in the framework.

In order to make a perfect seal between the reservoir A and top B, I have caused the upper edge of the former to be bent outward and into the circular groove $b$, formed in the top B. In this groove $b$ rests a gasket $c$, which in conjunction with the screw-pressed plate E, held down by means of the cross-bar F, forms an air-tight and readily-removable cover.

Soldered or otherwise secured to the lower conical extremity of the reservoir A is the ring G, which is formed with projecting lugs $d$. Beneath the ring G and held thereto by means of the nuts $e$, which engage with lugs $d$, is the metal box H. Within this box H is the feeder I, which consists of the stationary chute J and an adjacent oscillating gage K. This gage K is a hollow metal box formed with a side inlet-opening $f$ and a bottom discharge-opening $g$. The opening $f$ is so positioned as to pass a side opening $h$ in the chute J, while the opening $g$ is arranged to pass a stationary partition $i$, cast across the box H. The lower extremity of the box H engages with a gasket $j$ on the upper rim of the water-reservoir L. This reservoir L rests on the platform M, which is pivoted to the framework C, while the long rod N and threaded wheel O afford a simple means for holding the reservoir L firmly against the box H.

Having thus explained the general construction of the device, I will now set forth the operation of the same.

Assuming that the reservoir L contains the desired amount of water and that the reservoir A contains the calcium carbid and, further, that the gage K is in the position shown, which is its normal one, it is manifest that the carbid will pass from the reservoir A through the openings $h$ and $f$, thereby completely filling the gage K. Now as the gas is consumed and the ordinarily-formed bell reservoir descends any suitably-placed rod or lug P on the latter will come in contact with the lever Q, which is connected to the pivoted gage K, thereby carrying it downward in the direction of the arrow in Fig. 1 until the opening $g$ passes the partition $i$, when the contents of the gage will be dropped in the water-reservoir. Now as the gas is generated and passes into the bell receiver through the outlet R the bell will rise and permit the gage $k$ to resume its normal position, when it is again filled with carbid from reservoir A.

In order to prevent the clogging of the carbid between the gage $k$ and partition $i$, I have allowed a small space between the central portion of the gage and the partition, while the sides of the gage form flanges which work snugly against the partition.

In order to gain ready access to the interior of the box H, I have formed the latter of two halves with V-shaped abutting edges. These halves I hold firmly together by means of the bolts $m$.

From the above description it will be readily seen that the quantity of carbid possible to feed at any one time is regulated by the capacity of the gage, thereby completely obviating any danger of feeding more carbid than the machine is capable of accommodating.

I am aware that various changes in the form and proportion of parts of the devices herein shown and described as an embodiment of my invention can be made without departing from the spirit or sacrificing any of the advantages thereof, and I therefore reserve the right to make such changes and alterations as fairly fall within the scope of my invention.

What I claim is—

1. In a feeder for acetylene-gas machines, the reservoir for holding carbid, and a reservoir for holding water, combined with a box placed below the chamber for holding the carbid, a stationary chute placed in said box, and having a discharge-opening at its bottom, combined with an oscillating gage having an opening at its top to receive the carbid and an opening at its lower end to discharge it, the stationary partition arranged opposite the discharge-opening from the gage, and means for moving the gage, substantially as described.

2. In a feeder for acetylene-gas machines, the chamber A for holding the carbid, and which is secured to a suitable framework, the box H connected to the lower end of the carbid-chamber, and a chamber for holding water placed below the box, combined with a stationary chute J secured in the top of the box, and which chute is provided with an opening at its lower end, a pivoted gage K having an opening through its top to receive the carbid, and an opening through its bottom to discharge it, a partition $i$ placed below the gage and which is separated a slight distance therefrom, and means for operating the gage, substantially as set forth.

In testimony whereof I affix my signature in presence of two witnesses.

CHRISTOPHER M. BRIDGES.

Witnesses:
MARTIN ARONSOHN,
ELIZ. KINCAID.